(12) United States Patent
Xie et al.

(10) Patent No.: US 8,361,368 B2
(45) Date of Patent: Jan. 29, 2013

(54) SMART DEVICES BASED ON A DYNAMIC SHAPE MEMORY EFFECT FOR POLYMERS

(75) Inventors: Tao Xie, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 530 days.

(21) Appl. No.: 12/565,011

(22) Filed: Sep. 23, 2009

(65) Prior Publication Data

US 2011/0071271 A1    Mar. 24, 2011

(51) Int. Cl.
*B29C 61/06* (2006.01)

(52) U.S. Cl. ........ 264/230; 264/219; 264/479; 264/232; 264/239; 264/280; 264/285; 264/294; 264/345; 525/326.2; 528/391

(58) Field of Classification Search .................. 528/391; 264/219, 230, 479
See application file for complete search history.

(56) References Cited

U.S. PATENT DOCUMENTS 6,388,043 B1 * 5/2002 Langer et al. .................. 528/80
7,022,810 B1 * 4/2006 Cornelius ..................... 528/353

OTHER PUBLICATIONS

Osborn, Macromolecules, 2007, 40, 3886-3890.*
I. Bellin et al; Polymeric triple-shape materials; Proceedings of the National Academy of Sciences of the United States of America; PNAS 2006; 103; 18043-18047; originally published online Nov. 20, 2006; doi: 10.1073/pnas. 0608586103; PNAS; Nov. 28, 2006, vol. 103, No. 48; 18043-18047.
Marc Behl et al; One-Step Process for Creating Triple-Shape Capability of AB Polymer Networks; Wiley InterScience; 2009 Wiley-VCH Verlag GmbH & Co. KGaA, Weinheim; Adv. Funct. Mater. 2009, 19, 102-108.
Tao Xie et al; Revealing Triple-Shape Memory Effect by Polymer Bilayersa; Macromolecular Rapid communications 2009, 30, 1823-1827; Wiley-VCH Verlag GmbH & Co. KGaA, Weinheim; Wiley InterScience.

* cited by examiner

*Primary Examiner* — Robert C Boyle
(74) *Attorney, Agent, or Firm* — Reising Ethington P.C.

(57) ABSTRACT

Certain polymer materials, including perfluorosulfonic acid ionomers, have been found to be capable of being deformed from an initial permanent shape into three or more temporary shapes. An article thus formed from such a polymer material may be used initially in a final temporary shape. As the article is progressively heated, the polymer composition reverts successively from its final temporary shape through its intermediate temporary shapes. If a suitable temperature is reached, the original permanent shape is recovered. The article may be devised to serve successive functions in each of its several shapes.

3 Claims, 5 Drawing Sheets

Temperature Increase

SMART DEVICES BASED ON A DYNAMIC SHAPE MEMORY EFFECT FOR POLYMERS

TECHNICAL FIELD

This invention pertains to making and using polymer devices that display three or more shape memory events when subjected to an external stimulus such as heating. Such devices are sometimes called "smart" devices because they appear to remember previously imparted shapes when they are heated. The invention, in which three or more such shapes are remembered, is particularly applicable to polymer compositions displaying a broad glass transition temperature range.

BACKGROUND OF THE INVENTION

Present shape memory polymers are materials that can memorize one or two temporary shapes and eventually revert to an original permanent shape upon exposure to an external microstructural-transforming stimulus such as heat. In some shape memory polymers the external stimulus for shape change may be an electric or magnetic field, light, or a change in pH.

A conventional shape memory polymer (SMP) is deformed at an elevated temperature (deformation temperature, $T_d$) and the deformed temporary shape is fixed upon cooling. Often, this deformation temperature is above the glass transition temperature of the polymer composition. When heated to a recovery temperature ($T_r$), the temporary shape reverts to the original permanent shape. With a total of two shapes involved in each shape memory cycle, such an effect is called dual-shape memory effect (DSME) where the two shapes consist of the deformed temporary shape and the permanent shape. Quantitatively, this effect is evaluated based on the percentage of shape fixation of the temporary shape (shape fixity $R_f$, i.e. strain imposed compared to strain retained) and shape recovery of the permanent shape (shape recovery, $R_r$).

At the molecular level, materials displaying the DSME typically possess a polymer microstructural mechanism for setting the permanent shape and a reversible polymer phase transition for fixing the temporary shape. A prototype shape memory cycle occurs with both shape fixation and recovery above a reversible phase transition temperature (or the shape memory transition temperature, $T_{trans}$).

In contrast to polymer materials displaying a dual-shape memory effect, a triple-shape memory effect has also been observed in some polymers. The triple-shape memory effect refers to the capability of some combinations of polymer materials to memorize a second temporary shape (three shapes are involved) using an additional reversible phase transition in the polymer composition. The fixation of two temporary shapes in a body of the polymer (and subsequent shape recovery) for a triple-shape memory polymer is achieved either above or between two transition temperatures existing in the mixed polymer composition.

Overall, various SMP systems have been adapted for use in a number of very useful applications including biomedical devices, self-healing surfaces, "smart" fasteners, and "smart" adhesives. In each of these applications the polymer may be placed in a temporary shape for initial placement. But upon heating (or other application of energy) the polymer self-transforms from its temporary shape to its permanent shape. It is apparent that the ultimate potential of this class of materials hinges heavily on tailoring (or tuning) their shape memory properties for the targeted applications. Due to the strong tie between $R_f$ (and $R_r$) and $T_{trans}$, tuning shape memory properties often involves adjustment in $T_{trans}$, which requires material composition change via synthesis of new polymers or modification of existing polymers.

There remains a need for the adaptation of new polymer materials and new uses of polymer materials in SMP applications.

SUMMARY OF THE INVENTION

In the many possible embodiments of this invention, a single polymer composition with a single broad reversible phase transition is used to display a dual-, triple-, and even quadruple-shape memory effect. The availability of multiple temporary shapes is sometimes referred to herein as a "dynamic" memory shape effect. This unprecedented availability of three or more temporary shapes enables an article of the material to be given a permanent shape at a first relatively high temperature and a selected strain level and three or more temporary shapes at progressively lower temperatures and different strain levels. The article may be initially used in its third temporary shape indefinitely at a temperature below its lowest strain temperature. As the article experiences increasing temperatures (or other suitable energy input) it progressively transforms its shape from its third temporary shape to its second temporary shape, and from its second temporary shape to its first temporary shape, and from its first temporary shape to its permanent shape.

The invention may be practiced on substantially single polymer compositions displaying a quite broad glass transition range. This transition range is observed, for example, in a dynamic mechanical analysis of the viscoelastic polymer material as presented in a graph of the log(E') in MPa v. temperature (° C.) where E' is the storage modulus of the polymer. The transition range may also be observed in a graph of tan δ v. temperature of the polymer. In many embodiments, such polymers will be co-polymers with pendant groups along the polymer molecular chains. The size and distribution of such pendant groups determine the breadth of the thermal transition and enable the polymer to assume (and remember) different shapes if the transition occurs over a sufficiently wide temperature range.

In a preferred embodiment, a polymer exhibiting the multiple-shape memory effect utilized in practices of this invention is DuPont's NAFION®, a commercial thermoplastic perfluorosulfonic acid ionomer with a polytetrafluoroethylene (PTFE) backbone and perfluoroether sulfonic acid side chains. Members of this polymer family display broad glass transition temperature ranges, for example from about 55° C. to about 130° C., that are useful in the practice of embodiments of this invention.

In a first illustrative embodiment of the invention, a film strip of this perfluorosulfonic acid ionomer having a permanent shape A was deformed at 140° C. to a different and temporary shape and fixed in the temporary shape at a lower temperature with substantially 100% fixity ($R_f$). The permanent shape was restored with substantially 100% recovery by reheating to 140° C. This dual-shape memory cycling of the perfluorosulfonic acid ionomer was also demonstrated using lower deformation and recovery temperatures.

In another illustrated embodiment of the invention, a film strip of the perfluorosulfonic acid ionomer having a permanent shape A was deformed at 140° C. and fixed at 68° C. to yield a first temporary shape B. Temporary shape B was deformed at 68° C. and fixed at 20° C. to yield a second temporary shape C. Upon reheating the film to 68° C. the recovered first shape $B_{rec}$ was obtained. When the deformed film was further heated to 140° C. the permanent shape was recovered $A_{rec}$. This embodiment demonstrated the practice of triple-shape memory effect with this polymer.

In still another illustrated embodiment of the invention, a film strip of the perfluorosulfonic acid ionomer film having a permanent shape A was deformed at 140° C. and fixed at 107° C. to yield a first temporary shape B. Temporary shape B was deformed at 107° C. and fixed at 68° C. to yield a second temporary shape C. Temporary shape C was deformed at 68° C. and fixed at 20° C. to obtain temporary shape D. Upon heating temporary shape D to 68° C., temporary shape C was recovered. Upon heating temporary shape C to 107° C., temporary shape B was recovered. And upon heating temporary shape B to 140° C., permanent shape A was recovered. This is the first known example of a quadruple-shape memory cycle in a polymer.

Polymer systems, such as perfluorosulfonic acid ionomers, having broad glass transitions and suitable side chain-containing molecules may be processed to have multiple temporary strained shapes that may be successively recovered to return to an initial permanent strained shape. Examples of other polymer compositions include copolymers of methyl methacrylate and butyl methacrylate with a broad distribution in composition such as a compositional gradient copolymer. The pendant methyl and butyl ester groups contribute to available multiple shape transitions In accordance with practices of this invention, such unique polymer compositions enable the making of polymer-containing articles that may have three or four shapes (for example) that may be utilized in applications in which the article may be subjected to progressively increasing temperatures and will progressively return to an earlier temporary shape or, ultimately, to an original permanent shape.

The third or greater temporary shape may be set for stability in a device at a desired temperature of initial operation. For example, the initial temperature of operation may be an ambient temperature in which a device in its final temporary shape may be placed and used. Such a temperature may be about 30° C. or lower. Then, as the device experiences successively higher temperatures it will experience successive shape changes to its earlier temporary shapes, and in some instances, to its permanent shape. For example, controlled expansion foam bodies and multiple position strip valves can be made that take multiple new shapes with temperature increases or other energy stimulation.

Other objects and advantages of the invention will be apparent from a further description of preferred embodiments which follows in this specification.

DESCRIPTION OF PREFERRED EMBODIMENTS

Figure 1:
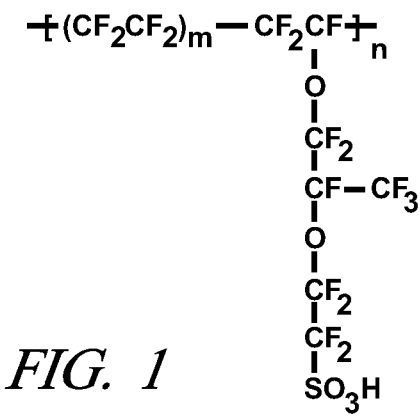
FIG. 1 illustrates the chemical structure of a perfluorosulfonic acid ionomer. This polymer is demonstrated in this specification to display the dynamic shape memory effect.

One polymer family exhibiting the discovered dynamic shape memory effect that is NAFION®, a commercial thermoplastic perfluorosulfonic acid ionomer with a polytetrafluoroethylene (PTFE) backbone and perfluoroether sulfonic acid side chains as illustrated schematically by its chemical formula in FIG. 1. The protons on the sulfonic acid side chains are mobile and the polymer is in its ionic state. The perfluoroether sulfonic acid side chains are illustrated simply as straight chains but it is believed that their incidence, location and configuration in cooperation with the PTFE molecular backbone contribute significantly to the unexpected dynamic shape memory effect that we have discovered in this polymer composition.

Due to its proton conducting capability, this perfluorosulfonic acid ionomer has been extensively studied as proton exchange membranes for fuel cells. Besides fuel cells, this polymer has also been used in a number of other applications including chlor-alkali cells, sensors, and actuators. The perfluorosulfonic acid ionomer possesses an amorphous phase (the broad glass transition from ~55° C. to ~130° C., shown in FIG. 2), an ionic cluster phase, and a crystalline phase. Although the exact nature of the thermal transition for the ionic phase is debatable, it is generally known that the crystalline transition occurs at a very high temperature of around 240° C. While a high temperature crystalline phase transition is a commonly known mechanism for setting permanent shapes for SMP, it is to be noted that ionic interactions have also been explored for such a function (the reported SMP system shows only the traditional DSME). The combination of a reversible glass transition (FIG. 2) and the mechanism for setting a permanent shape served as our initial motivation to explore the shape memory properties for this family of polymers.

Figure 2:
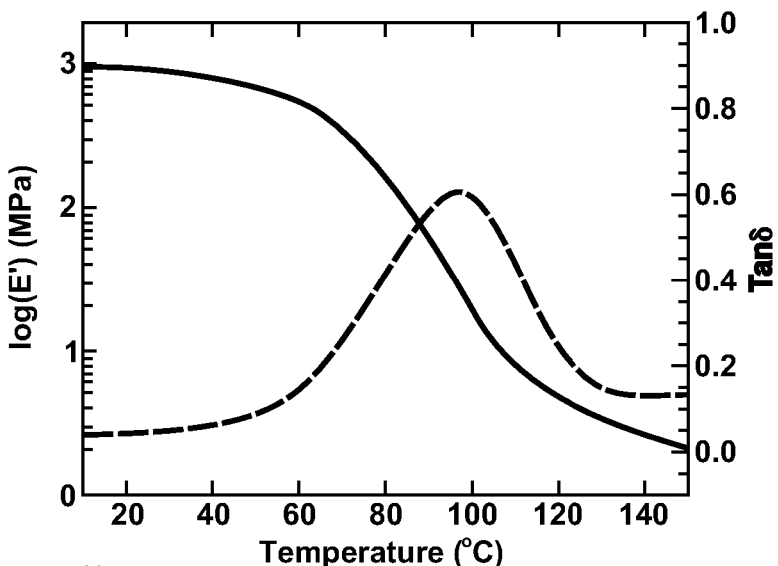
FIG. 2 is a compound graph of a dynamic mechanical analysis of a perfluorosulfonic acid ionomer composed as illustrated in FIG. 1. The graph presents log E'(MPa) for the ionomer (solid line curve) on the left vertical axis (the numbers representing powers of 10) v. temperature (° C.) on the horizontal axis and tan δ (dashed line curve) on the right vertical axis v. temperature.

FIG. 2 is a graph of log(E') in MPa and of tan δ (left and right vertical axes, respectively) each plotted against temperature (° C.). It is seen that the modulus of the ionomer decreases by about two orders of magnitude as the polymer is heated over this transition range of about 75° C. It is believed that this large range is an indicator of the polymer thermomechanical properties which may contribute to the unique dynamic shape memory effect that we have observed in this polymer as illustrated herein.

Films of NAFION® in its acid form with an equivalent weight of 1,000 (m=5.56), and a thickness of 0.08 mm were obtained from DuPont and used throughout the embodiments and illustrations that follow in this specification.

Dynamic mechanical analysis (DMA) experiments were conducted in a tensile mode using a DMA Q800 (TA instruments). Each film sample was annealed at 140° C. for 30 minutes prior to testing. The DMA curve was obtained in a "multi-frequency, strain" mode at 1 Hz, 0.3% strain, and a heating rate of 3° C./min.

All quantitative shape memory properties (including dual-, triple-, and quadruple-shape memory) were evaluated in a tensile and force controlled mode in a typical DMA setup. The heating and cooling rates were both 5° C./min. The shape fixity ($R_f$) from shape X to shape Y and shape recovery ($R_r$) from Y to X were calculated using:

$$R_f(X \to Y) = 100\% \times (\epsilon_y - \epsilon_x)/(\epsilon_{yload} - \epsilon_x) \qquad (1)$$

$$R_r(Y \to X) = 100\% \times (\epsilon_y - \epsilon_{xrec})/(\epsilon_y - \epsilon_x) \qquad (2),$$

where $\epsilon_{yload}$ represents maximum strain under load, $\epsilon_u$, and $\epsilon_x$ are fixed strains after cooling and load removal, and $\epsilon_{xrec}$ is the strain after recovery.

Visual demonstrations of the triple-shape memory effect and quadruple-shape memory effect were carried out using oven heating. A thirty minute equilibrium time was used for any temperature changes which occurred during the shape memory cycles.

Prior to evaluating the thermomechanical and shape memory performance of the perfluorosulfonic acid ionomer films, the polymer was first annealed at 140° C., upon which it shrank by about 26% and reached an equilibrium length. The shrinkage was primarily due to the removal of residual stress/strain from the processing of the polymer into a film. In much of the following experimental work, the equilibrium dimension after annealing defined its "permanent shape" in the shape memory testing. The annealing led to polymer darkening, but the infrared spectra of the polymer before and after annealing appeared nearly identical, suggesting that the primary polymer structure remained intact.

After annealing, the shape memory performance of the perfluorosulfonic acid ionomer films was evaluated using DMA in a tensile and force controlled mode. Ribbon sections of carefully determined dimensions were cut from the annealed films. These original ribbons were considered the permanent shapes of the polymer in each of the following shape memory tests. The varying temperatures, stresses, resulting strains, and time of deformation were carefully determined and recorded in each of the shape memory experiments described below in this specification and summarized in the graphs of FIGS. 3-5 and 7-10. After the ribbons were deformed or restored the shape fixity ($R_f$) and shape recovery ($R_r$) were calculated using equations (1) and (2).

Figure 3:
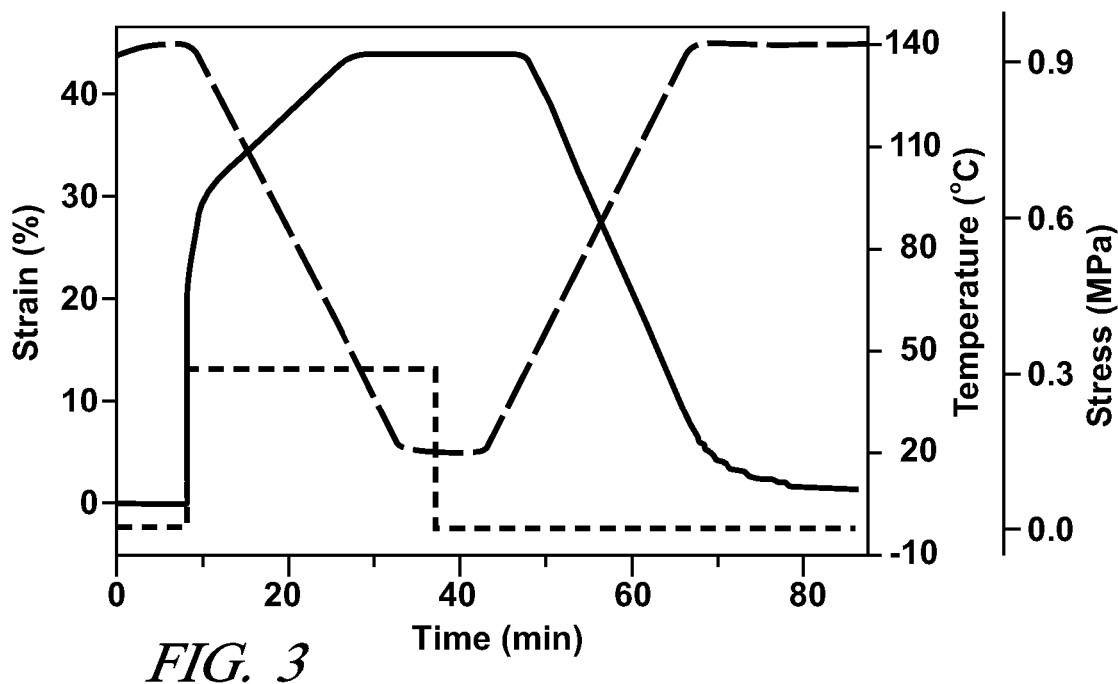
FIG. 3 is a graph illustrating a dual-shape memory cycle of the perfluorosulfonic acid ionomer at $T_d=T_r=140°$ C. Strain (%) (solid line), Temperature (° C.) (long dash line), and Stress (MPa) (short dash line) are presented on vertical axes, and Time (min) is presented on the horizontal axis.
Figure 4:
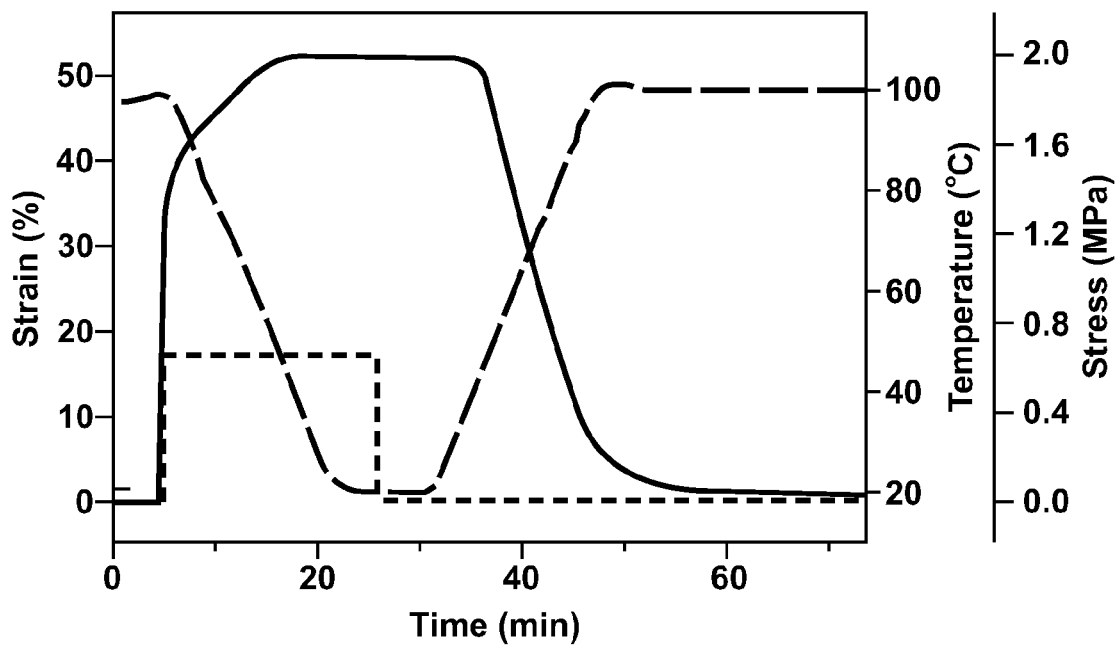
FIG. 4 is a graph illustrating a dual-shape memory cycle of the perfluorosulfonic acid ionomer at $T_d=T_r=100°$ C. Strain (%) (solid line), Temperature (° C.) (long dash line), and Stress (MPa) (short dash line) are presented on vertical axes, and Time (min) is presented on the horizontal axis.
Figure 5:
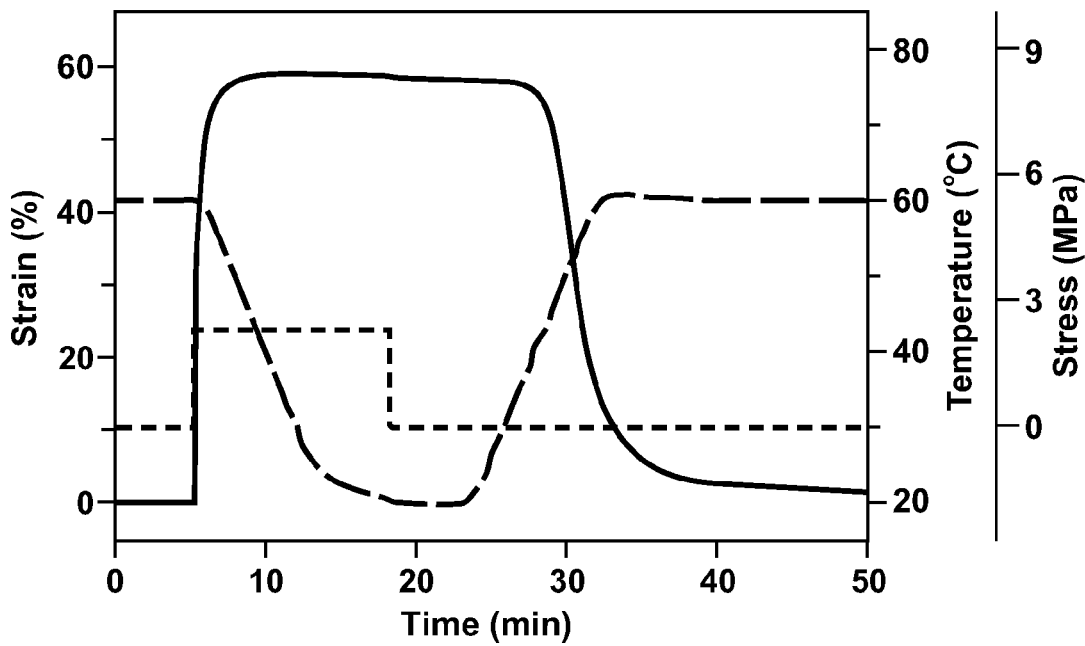
FIG. 5 is a graph illustrating a dual-shape memory cycle of the perfluorosulfonic acid ionomer at $T_d=T_r=60°$ C. Strain (%) (solid line), Temperature (° C.) (long dash line), and Stress (MPa) (short dash line) are presented on vertical axes, and Time (min) is presented on the horizontal axis.

FIG. 3 shows a graph presenting the stress (short dash line with reference to outer right vertical axis) applied to deform a ribbon of initial permanent shape at a temperature (long dash line with reference to inner right vertical axis) at a time in minutes (horizontal axis) with a resulting stain from the permanent shape (solid line with reference to left vertical axis). A like presentation of the data reflecting the formation of temporary shapes and restoration of shapes is presented in FIGS. 4, 5, and 7-10.

As seen in FIG. 3, an initial ribbon (permanent shape of the ribbon article) was heated to 140° C. After about eight minutes a tensile stress of 0.3 MPa was applied to the ribbon. As the stress was applied and maintained the ribbon was cooled at a rate of 5° C./min to a temperature of 20° C. The applied tensile stress introduced a strain of about 45% in the ribbon which was set in the ribbon by the cooling. Thus, the ribbon acquired a temporary shape. At about 44 minutes into the test the deformed ribbon (in its temporary shape) was heated at 5° C./min to 140° C. under no stress. During the heating, the introduced strain was progressively removed and, at about 80 minutes into this thermomechanical testing, the ribbon had restored itself to substantially its original or permanent shape.

Figure 6:
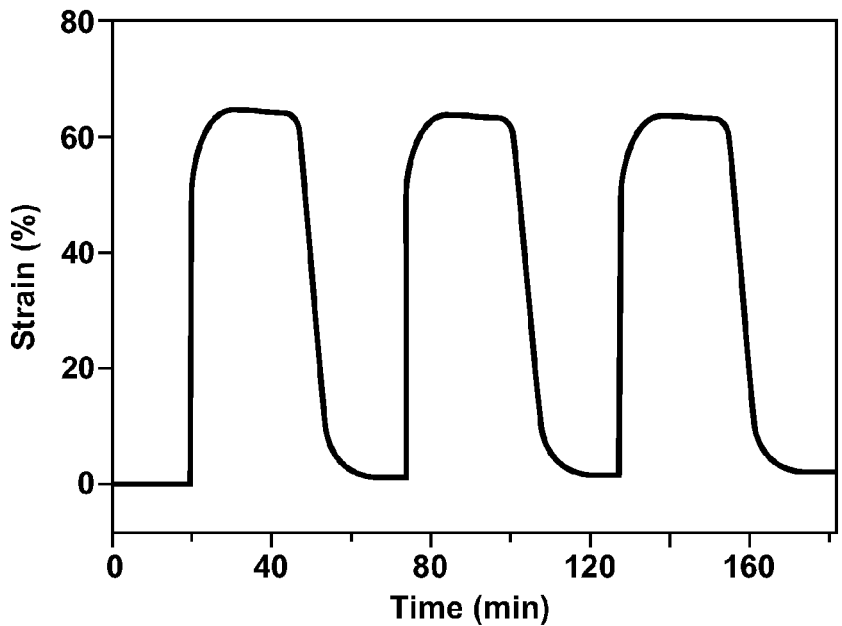
FIG. 6 is a graph of strain (%) v. time (min) illustrating consecutive dual shape memory cycling of a perfluorosulfonic acid ionomer at $T_d=T_r=80°$ C.

Thus, when deformed and recovered at 140° C. (i.e. $T_d$ and $T_r$ both above the upper end of the glass transition), excellent dual-shape memory performance (both $R_f$ and $R_r$ approaching 100%) was observed (FIG. 3). Shape fixing and recovery can also be carried out near the peak (FIG. 4, $T_d=T_r=100°$ C.) or the onset (FIG. 5, $T_d=T_r=60°$ C.) of the glass transition, with the values of both $R_f$ and $R_r$ above 97% in both cases. Quantitatively, the excellent shape fixing and recovering capability for perfluorosulfonic acid ionomer at any temperature above the onset of its glass transition distinguishes it from known SMP. It is also noted that, upon consecutive dual-shape memory cycling (FIG. 6, $T_d=T_r=80°$ C.), the perfluorosulfonic acid ionomer experienced very minimal deterioration in either $R_f$ or $R_r$, a desirable attribute for SMP.

Figure 7:
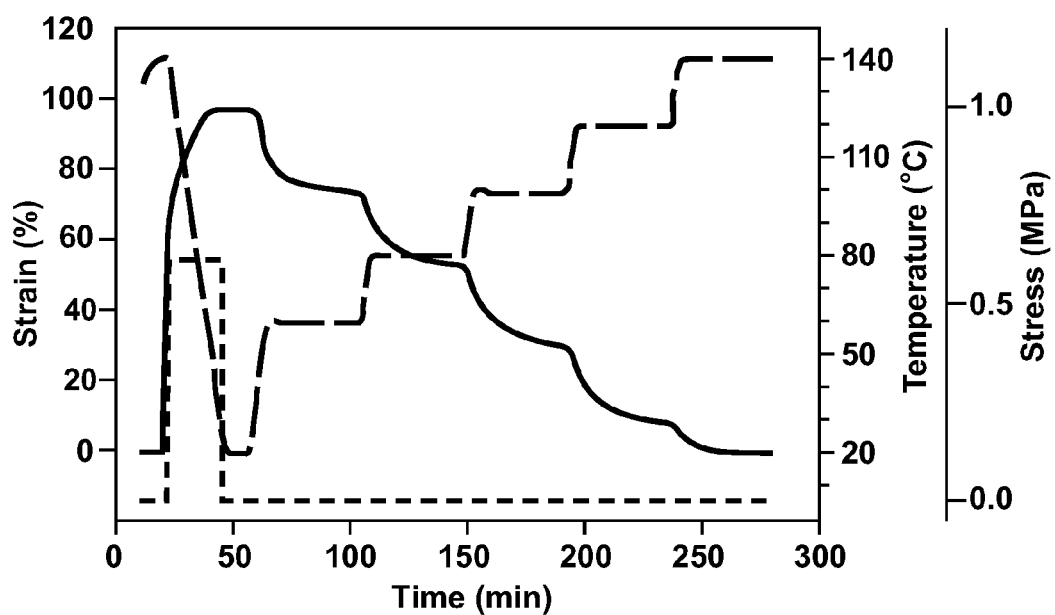
FIG. 7 is a graph illustrating multi-staged shape memory recovery of the perfluorosulfonic acid ionomer at $T_d=140°$ C. Strain (%) (solid line), Temperature (° C.) (long dash line), and Stress (MPa) (short dash line) are presented on vertical axes, and Time (min) is presented on the horizontal axis.

In the dual memory shape test summarized in FIG. 7, the initial shape was deformed to a temporary shape at about 140° C. at a stress of about 0.6 MPa to a strain of about 100%. Again, the temporary shape was set at a temperature of about 20° C. As seen in FIG. 7 the ribbon was heated from 20° C. by pausing at temperature plateaus of 60° C., 80° C., 100° C., 120° C., and 140° C. But the strain was not wholly removed to perfectly restore the permanent shape. Although deformation imparted at a temperature as low as 60° C. can be fully recovered at the same temperature, the deformation strain introduced at 140° C. was unable to recover fully at lower temperatures. As shown in FIG. 7, for perfluorosulfonic acid ionomer deformed at 140° C., increasing the recovery temperature in a staged manner led to a staged recovery behavior. This multi-stage recovery indicates that the polymer memorizes not just the strain, but also the deformation history.

The multi-stage recovery (FIG. 7) indicates that the polymer can memorize multiple temporary shapes in a single shape memory cycle, i.e. multi-shape memory effect.

It is to be emphasized that current triple-shape memory polymer systems rely on two discrete phase transitions to fix two temporary shapes. Tuning triple-shape memory effect for such systems would require varying the ratio between the two reversible phases or changing the reversible phase transition temperatures, which cannot be realized without change in material composition. NAFION®, in contrast, has only one broad phase transition and its triple-shape memory effect, theoretically, can be realized at any two temperatures above the onset of its glass transition temperature.

Figure 8:
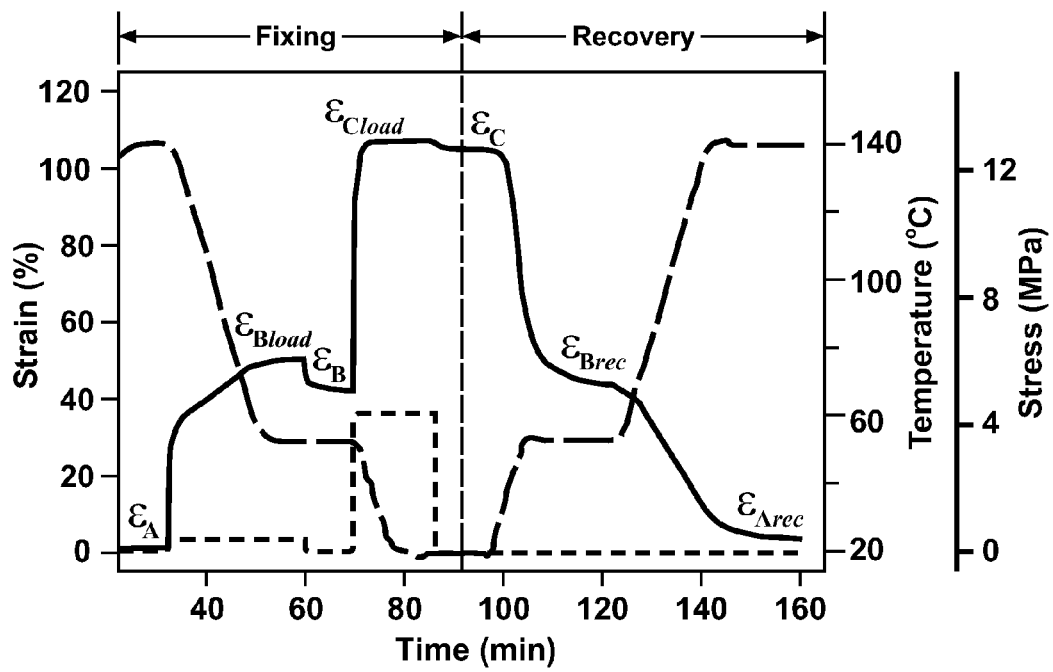
FIG. 8 is a graph illustrating a first example of a triple-shape memory cycle of the perfluorosulfonic acid ionomer. Strain (%) (solid line), Temperature (° C.) (long dash line), and Stress (MPa) (short dash line) are presented on vertical axes, and Time (min) is presented on the horizontal axis.
Figure 9:
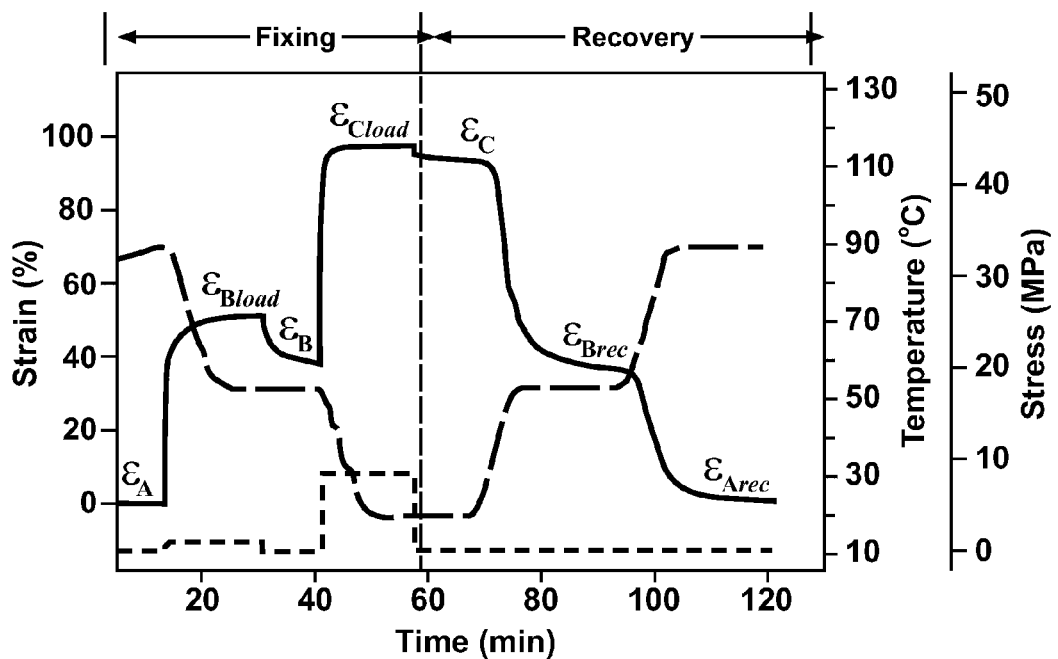
FIG. 9 is a graph illustrating a second example of a triple-shape memory cycle of the perfluorosulfonic acid ionomer. Strain (%) (solid line), Temperature (° C.) (long dash line), and Stress (MPa) (short dash line) are presented on vertical axes, and Time (min) is presented on the horizontal axis.
Figure 10:
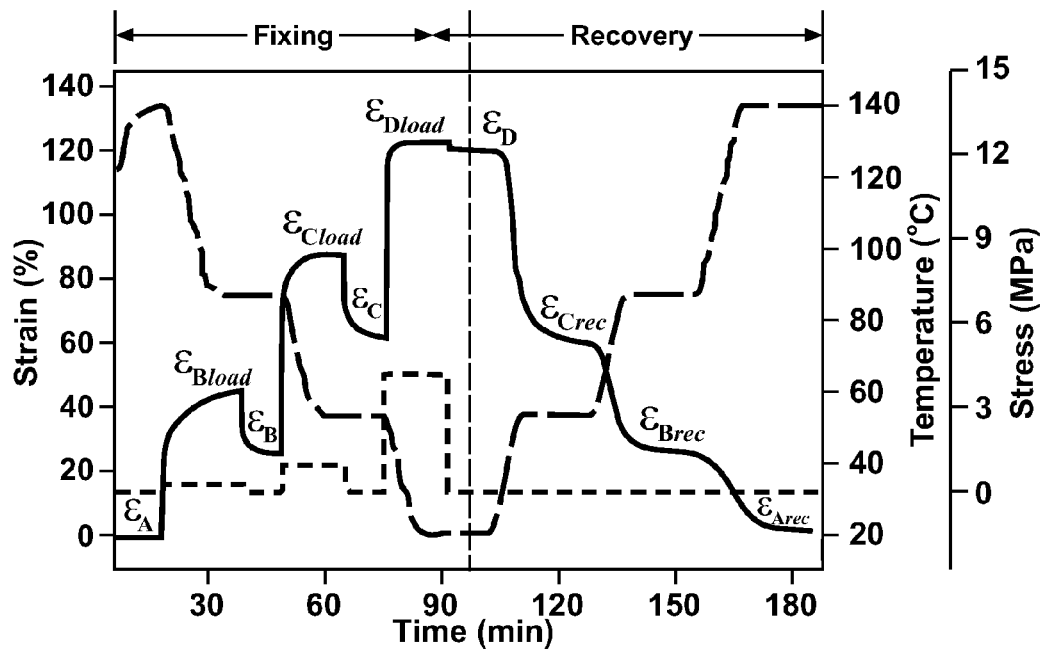
FIG. 10 is a graph illustrating an example of a quadruple-shape memory cycle of the perfluorosulfonic acid ionomer. Strain (%) (solid line), Temperature (° C.) (long dash line), and Stress (MPa) (short dash line) are presented on vertical axes, and Time (min) is presented on the horizontal axis.

FIGS. 8 and 9 summarize stress-strain-temperature-time date for the practice of triple-shape memory effect on ribbons of the perfluorosulfonic acid ionomer. In the test of FIG. 8 the ribbon (permanent shape A) was heated to 140° C. and subjected to a relatively low stress of 0.3 MPa as the ribbon was cooled at 5° C./min to 53° C. A first temporary shape (B) having a strain of about 40% was set at this temperature. $R_f(A \to B)$ was 83.5%. A stress of about 4.3 MPa was applied as the ribbon was cooled to about 20° C. to set the ribbon in a second temporary shape (B) in which the strain from the permanent shape was about 110%. $R_f(B \to C)$ was 96.7%. The twice-deformed ribbon (C) was heated to and at 53° C. to restore the first temporary shape (B). $R_r(C \to B)$ was 97.4%. The ribbon in its first temporary shape was heated to 140° C. to restore its permanent shape A. $R_r(B \to A)$ was 94.6%.

FIG. 8 shows the triple-shape memory effect for this perfluorosulfonic acid ionomer at two deformation temperatures at 140° C. and 53° C., the triple-shape memory effect with this perfluorosulfonic acid ionomer was also achieved at 90° C. and 53° C. (FIG. 9), reflecting its dynamic nature. In this test $R_f(A \to B)$ was 74.5%, $R_f(B \to C)$ was 94.0%, $R_r(C \to B)$ was 100.4%, and $R_r(B \to A)$ was 97.9%. As seen, a notable difference between FIG. 8 and FIG. 9, however, lies in the first shape fixity ($R_f(A \to B)$ being 83.5% and 74.5%, respectively), suggesting that the first shape fixity is closely related to the difference between the two deformation temperatures in the corresponding triple-shape memory cycle.

The dynamic shape memory effect of this perfluorosulfonic acid ionomer is also reflected in a quadruple-shape memory effect. As demonstrated in FIG. 10, starting as a permanent shape A, the ionomer can memorize three temporary shapes (B, C, and D) in each shape memory cycle. Subsequent heating at the relevant temperatures led to the recovered shapes ($C_{rec}$, $B_{rec}$, and $A_{rec}$). The thermomechanical testing summarized in FIG. 10 was conducted as follows: ($T_{d1}=T_{r3}=140°$ C., $T_{d2}=T_{r2}=90°$ C., $T_{d3}=T_{r1}=53°$ C.). The following fixity and recovery values were experienced in the ribbon: $R_f(A \to B)$: 58.7%, $R_f(B \to C)$: 57.1%, $R_f(C \to D)$: 96.1%, shape recovery $R_r(D \to C)$: 100.0%, $R_r(C \to B)$: 99.6%, $R_r(B \to A)$: 93.0%.

While the $R_r$ values at all three recovery stages were above 93%, the first and second $R_f$ values were only about 60%. Theoretically, multi-shape memory effects beyond quadruple—are feasible as indicated in the multi-stage recovery shown in FIG. 7. It appears, however, that $R_f$ would be further compromised as the fixation of more temporary shapes demands shape fixation at a temperature too close to the corresponding deformation temperature.

Overall, this perfluorosulfonic acid ionomer exhibits unprecedented versatility as a shape memory polymer, reflecting the dynamic nature of its shape memory properties. The dynamic shape memory effect for this polymer stems from its broad glass transition. Such a transition can be viewed as a large number of reversible phase transitions (or amorphous domains), each corresponding to many narrow transition temperatures continuously distributed across the broad transition. Depending on the deformation temperature(s) during the shape memory cycles, a variable portion of its amorphous domains is responsible for its memory function(s). The discovery of this dynamic shape memory effect expands the technical scope for potential applications of shape memory polymers such as novel devices with multiple configurations.

Figure 11:
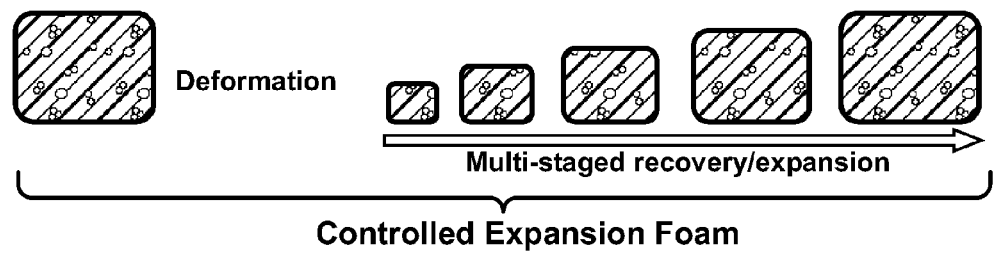
FIG. 11 is a schematic illustration of a heat induced multi-staged cubic foam body expansion through four temporary shapes to a large permanent shape.

FIG. 11 is a schematic illustration of a cubic body of a foamed polymer formed of a material (e.g., perfluorosulfonic acid ionomer) capable of quadruple-memory effect. In this illustration, the foamed article is trained to change mainly in size to serve its "smart" function. The original permanent size of the foamed cube is illustrated at the left of the sequence of cubes. The permanent shape is progressively compacted into four successively smaller temporary cube sizes. Upon heating to successively increased temperatures the smallest cube grows incrementally in size through three intermediate sizes until it attains the original largest cube size. This illustration demonstrates the utility of the multiple shape opportunities of this invention to provide larger shapes as temperature or other energy input is increased.

Figure 12:
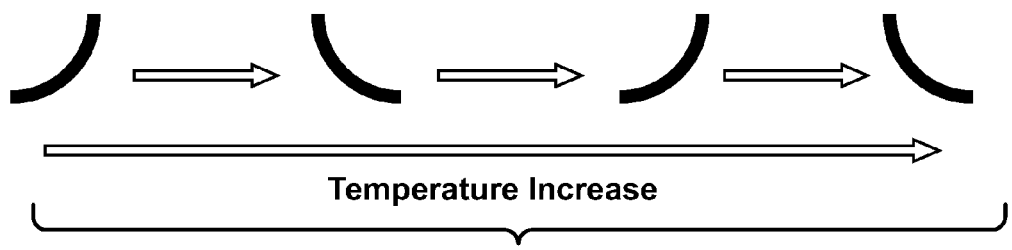
FIG. 12 is schematic illustration of a flap-valve adapted to assume different bending positions based on increasing temperature.

FIG. 12 is an illustration of a strip-like shape of a dynamic shape memory effect article that can be trained by use of temporary shapes to take different positions. In this figure the upper end of the vertically suspended strip is fixed and the other end of the strip has been trained to deflect (like, for example, a valve) from left-to-right and left-to-right with increasing temperature. This illustration demonstrates the utility of dynamic shape memory effect articles to assume different operative positions in serving an intended function.

While some practices of the invention have been illustrated, these embodiments are intended to illustrate the invention but not to limit its scope.

The invention claimed is:

1. A method of making a polymeric article having a plurality of shape memory configurations, the article being formed of a thermoplastic perfluorosulfonic acid ionomer polymer with a polytetrafluoroethylene molecular backbone and perfluoroether sulfonic acid side chains, the method comprising:

forming the polymer into a permanent shape so that the polymer is substantially free of residual stress from the process by which the shape was attained;

heating the polymer shape to a first deformation temperature and straining the article to a first temporary shape while cooling the article to a second temperature lower than the first deformation temperature, and setting the article in the first temporary shape at the second temperature;

deforming the article from the first temporary shape to a second temporary shape, the deformation starting at a temperature no higher than the second temperature and cooling the article during and after such deformation to a third temperature lower than the second temperature to set the article in a second temporary shape; and deforming the article, at least one more time, to a third temporary shape starting at a temperature no higher than the third temperature and cooling the article during and after such deformation to a fourth temperature lower than the third temperature to set the article in a third temporary shape; the article then being stable in the third temporary shape at a desired temperature of use while being susceptible to successively returning to its second temporary shape and to its first temporary shape and to its permanent shape as it may be exposed to higher temperatures.

2. A method as recited in claim 1 in which the permanent shape is formed at a temperature above the glass transition temperature of the polymer.

3. A method as recited in claim 1 in which the third temporary shape is stable at a temperature of about 30° C. or lower.

* * * * *